(12) United States Patent
Schmidt

(10) Patent No.: US 7,367,428 B2
(45) Date of Patent: May 6, 2008

(54) DEVICE FOR SUPPLYING A PLURALITY OF SERVICE POINTS, SUCH AS LUBRICATING POINTS

(75) Inventor: Hartmut Schmidt, Leimen (DE)

(73) Assignee: Lincoln GmbH & Co. KG, Walldorf (DE)

( * ) Notice: Subject to any disclaimer, the term of this patent is extended or adjusted under 35 U.S.C. 154(b) by 631 days.

(21) Appl. No.: 10/487,215

(22) PCT Filed: Dec. 5, 2002

(86) PCT No.: PCT/EP02/13758

§ 371 (c)(1), (2), (4) Date: Feb. 19, 2004

(87) PCT Pub. No.: WO03/067143

PCT Pub. Date: Aug. 14, 2003

(65) Prior Publication Data

US 2004/0191081 A1    Sep. 30, 2004

(30) Foreign Application Priority Data

Feb. 2, 2002    (DE) ................ 102 04 245

(51) Int. Cl.
*F01M 11/00*    (2006.01)
(52) U.S. Cl. .................. 184/6.28; 184/6.1; 184/7.4
(58) Field of Classification Search ............ 184/6.28, 184/6.1, 7.4
See application file for complete search history.

(56) References Cited

U.S. PATENT DOCUMENTS 5,285,871 A * 2/1994 Sievenpiper ............... 184/7.4

(Continued)

FOREIGN PATENT DOCUMENTS

FR    2 041 227    1/1971

(Continued)

OTHER PUBLICATIONS

Patent Abstracts of Japan, entitled *"Concentrated Lubricator"*, vol. 012, No. 404, (M-757), Oct. 26, 1988 & JP 63 145894 (Kowa KK), Jun. 17, 1988.

*Primary Examiner*—David M. Fenstermacher
(74) *Attorney, Agent, or Firm*—Wenderoth, Lind & Ponack, L.L.P.

(57) ABSTRACT

An apparatus for supplying a viscous material to locations, comprises:
  a pump;
  a supply line in fluid communication with the pump;
  a first main line having a first compression chamber;
  a second main line having a second compression chamber;
  a 3/2-way valve for placing the supply line in fluid communication with either the first main line or the second main line;
  a two-line distributor having a control piston; and
  a controller for controlling the pump and the 3/2-way valve, such that
    (i) at a start of a cycle the pump operates to deliver the viscous material, with the 3/2-way valve positioned so as to place the supply line in fluid communication with the first main line, through the supply line and into the first main line, and then
    (ii) through pressure build-up in the first main line, resulting from the viscous material flowing through the supply line into the first main line, the two-line distributor operates to transport the viscous material, by movement of the control piston, into the second compression chamber and to a plurality of the locations.

20 Claims, 1 Drawing Sheet

U.S. PATENT DOCUMENTS

| | | | |
|---|---|---|---|
| 6,199,661 B1* | 3/2001 | Kumar | 184/3.2 |
| 2002/0046905 A1* | 4/2002 | Hulkkonen et al. | 184/6.1 |
| 2002/0053332 A1* | 5/2002 | Chamberlin et al. | 123/196 R |
| 2003/0159889 A1* | 8/2003 | Johnson et al. | 184/15.3 |
| 2006/0054404 A1* | 3/2006 | El-Ibiary | 184/6 |

FOREIGN PATENT DOCUMENTS

| | | |
|---|---|---|
| FR | 2 613 032 | 9/1988 |
| GB | 1 570 009 | 6/1980 |

* cited by examiner

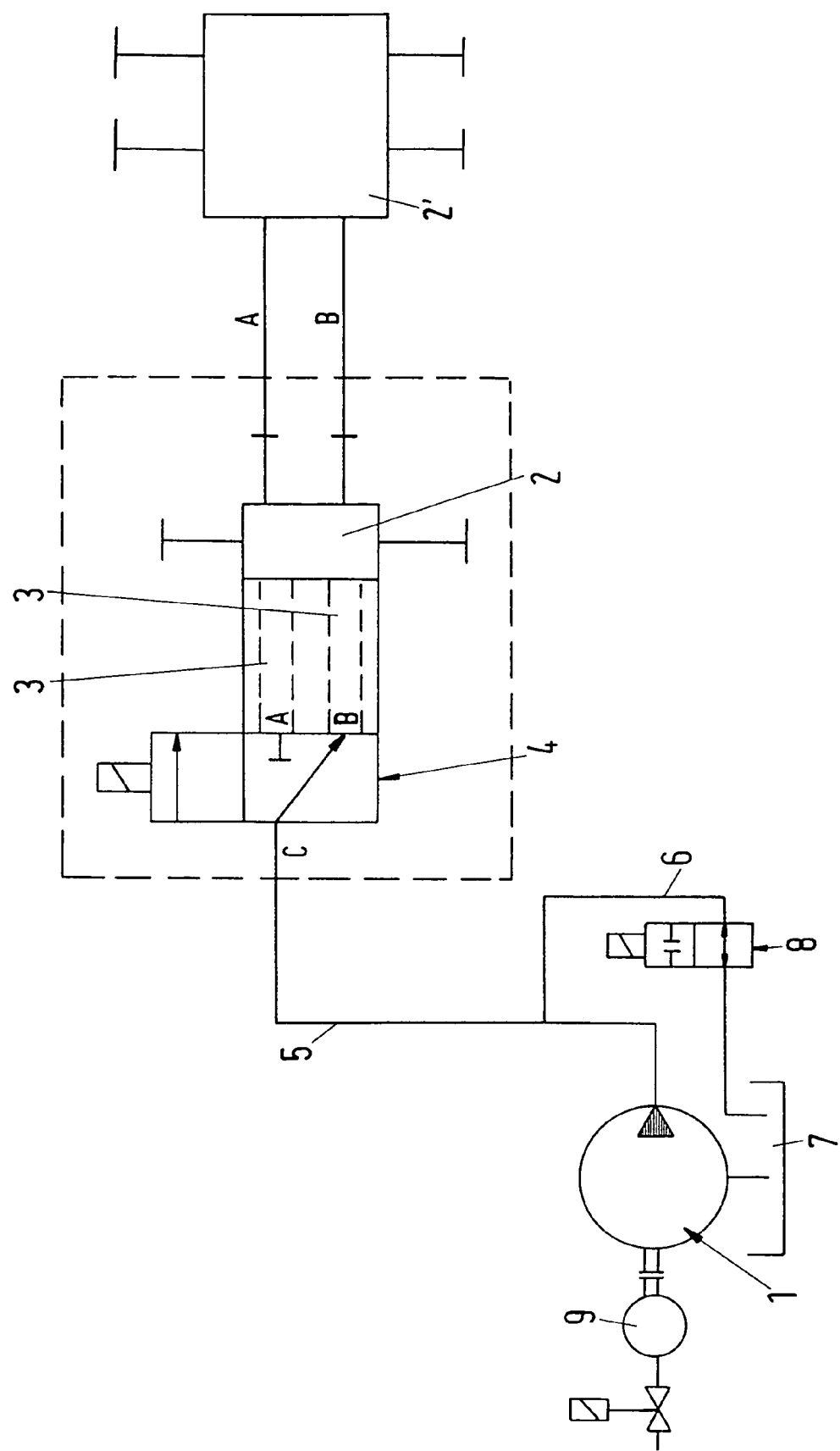

DEVICE FOR SUPPLYING A PLURALITY OF SERVICE POINTS, SUCH AS LUBRICATING POINTS

The invention relates to a device for supplying several lubrication sites or other servicing sites, such as lubrication sites, with lubricant or like viscous delivery media by use of a central pump.

For supply of several machine or lubrication site groups via a central pumping station with a viscous delivery medium, such as lubricant, either two-line systems or ejector section installations are conventionally employed. Distances between machines and lubrication site groups are bridged by lines of differing dimensions. In a case of two-line installations for lubricant, two main lines and additional shut-off valves in front of lubricant distributors are required. In a case of ejector section installations for lubricants, an additional air drive line to individual ejectors is required in addition to a lubricant supply line, which meters a delivery medium, such as the lubricant, volumetrically. In addition, for each ejector a control and maintenance unit is necessary.

The present invention addresses a problem of proposing a delivery medium, in particular a lubricant supply device of the above described type, which is simpler in terms of construction and operation and operates functionally reliably.

This task is solved, for example, in that the device is equipped with: a two-line distributor; a compression chamber for each of first and second main lines; a connection block assigned to the two-line distributor and containing, for example, a 3/2-way valve; a supply line connecting a pump with the connection block; a return line, branching off the supply line, to a delivery media reservoir, such as lubricant reservoir of the pump; a 2/2-way valve in the return line; and a controller for performing control, such that:

- at a start of a cycle the pump starts to deliver a delivery medium;
- simultaneously the 2/2-way valve in the return line is closed, while the 3/2-way valve opens a passage from the supply line to a first main line;
- through pressure build-up in the first main line the two-line distributor operates, whereby the delivery medium, such as lubricant, is transported by a control piston of a delivery medium distributor, in particular lubricant distributor, into the compression chamber of the second main line, as well as to 50% of servicing sites, such as lubrication sites, whereby these sites are supplied with delivery medium, such as lubricant;
- the pump changes into a resting position;
- the 2/2-way valve is opened and thereby the supply line and the first main line are relieved from pressure;
- optionally, after passage of a resting time, the pump starts to deliver again, wherein the 2/2-way valve in the return line is closed again, and the 3/2-way valve switches from the supply line to the second main line;
- due to pressure build-up in the second main line, the two-line distributor starts operating in an opposite direction as previously, whereby the delivery medium, such as lubricant, is transported by the control piston of the delivery medium distributor, in particular lubricant distributor, into the compression chamber of the first main line, as well as to the other 50% of the servicing sites, such as lubrication sites, whereby these sites are supplied with the delivery medium;
- the pump changes to its starting resting position; and
- the 2/2-way valve opens and thereby the supply line and the second main line are relieved from pressure, so that a next work cycle can start as before.

For reliable functional operation the pump can have associated with it a pressure switch, which, when a specified pressure in the supply line is reached, switches the pump into a resting position until—for example, after passage of a resting time—it starts delivering again.

For control of an operational function of the device of the invention the control piston of the two-line distributor can be provided with two control pins, which cooperate for example with proximity switches.

For extension of the device, it is also possible to have at least one further two-line distributor succeed the two-line distributor connected in series via the main lines.

Additional characteristics, advantages and application feasibilities of the invention are evident on the basis of a succeeding description of embodiment examples of the invention in conjunction with the drawing. All described and/or graphically represented characteristics by themselves or in any combination form the subject matter of the invention, independently of their combination in individual claims or their reference back.

BRIEF DESCRIPTION OF THE DRAWINGS

The sole FIGURE illustrates schematically a lubricant servicing device of the invention.

This device is structured as follows:

DETAILED DESCRIPTION OF THE PREFERRED EMBODIMENTS

A pump 1 driven by a motor 9 is connected across a supply line 5 of, for example, several meters, to a connection C of a connection block 4 comprising a 3/2-way valve of a two-line distributor 2. The 3/2-way valve of the connection block 4 is set such that two main lines A, B supply the two-line distributor 2, for example via several meters of line.

From the supply line 5 a return line 6 branches off in the proximity of the pump 1, which return line is equipped with a 2/2-way valve 8 and terminates in a lubricant reservoir 7 of pump 1. In the supply line 5, or the return line 6, a (not shown) pressure switch is installed in the vicinity of pump 1.

At a start this installation is relieved from pressure since the 2/2-way valve 8 at the pump 1 is open flow-free. The 3/2-way valve 4 in the connection block of the two-line distributor 2 has flow-free passage from the supply line 5 and the connection C to the main line B. After passage of a resting time, the pump 1 starts delivering. The 2/2-way valve 8 is simultaneously closed and the 3/2-way valve 4 is switched from main line B to main line A. Due to pressure build-up in the supply line 5 and the main line A, the two-line distributor 2 is operational, whereby drive lubricant therein is transported into a compression chamber of the main line B and to 50% of lubrication sites connected to the two-line distributor 2, whereby these sites are supplied with lubricant.

With sufficient pressure build-up the pressure switch is activated and the pump 1 switches into a resting position. Thereupon the 2/2-way valve 8 in the return line 6 is opened, such that the main line A and the supply line 5 are relieved from pressure.

After a renewed passage of a rest time, pump 1 starts to deliver again. The 2/2-way valve 8 on pump 1 closes, and the 3/2-way valve switches from main line A to the main line B. Due to pressure build-up in the supply line 5 and the main line B, the two-line distributor 2 now operates in a direction opposite to the one before, whereby the drive lubricant therein arrives in a compression chamber of the main line A and to the other 50% of the lubrication sites connected to the two-line distributor 2, whereby these sites are supplied with lubricant.

With adequate pressure build-up, the pressure switch is again activated, pump 1 is switched into a resting position, the 2/2-way valve 8 is opened and the main line B with the supply line 5 is relieved of pressure, such that a new operating cycle can start.

A, not shown, delivery piston of the two-line distributor 2 is provided, for example, with two control pins, which can be monitored with proximity switches. It is also possible to insert, following the two-line distributor 2, a second two-line distributor 2', connected in series via main lines A, B.

An advantage of the device according to the invention compared to conventional two-line installations is that a second supply line is omitted. Compared to ejector installations, a complete control line (compressed air line) with a maintenance unit is not needed. Consumption of drive medium is omitted.

Operation can take place with higher pressures, and various metering feasibilities are possible.

In all cases, mounting of the device according to the invention is simple, and cost in terms of material and mounting is low, because proven standard components can be utilized for its construction.

The inventive concept is not only restricted to supply of lubrication sites; it can equally well be applied to other viscous materials (and not only lubricants) and other servicing sites (and not only lubrication sites).

LIST OF REFERENCE SYMBOLS

1 Pump
2, 2' Two-line distributor
3 Compression Chamber
4 3/2-way valve
5 Supply Line
6 Return Line
7 Lubricant Reservoir
8 2/2-way valve
9 Motor
A First Main Line
B Second Main Line
C Connection

The invention claimed is:

1. An apparatus for supplying a viscous material to locations, comprising:
   a pump;
   a supply line in fluid communication with said pump;
   a first main line having a first compression chamber;
   a second main line having a second compression chamber;
   a 3/2-way valve for placing said supply line in fluid communication with either said first main line or said second main line;
   a two-line distributor having a control piston; and
   a controller for controlling said pump and said 3/2-way valve, such that
   (i) at a start of a cycle said pump operates to deliver the viscous material, with said 3/2-way valve positioned so as to place said supply line in fluid communication with said first main line, through said supply line and into said first main line, and then
   (ii) through pressure build-up in said first main line, resulting from the viscous material flowing through said supply line into said first main line, said two-line distributor operates to transport the viscous material, by movement of said control piston, into said second compression chamber and to a plurality of the locations.

2. The apparatus according to claim 1, further comprising:
   a return line branching from said supply line to a viscous material reservoir; and
   a 2/2-way valve in said return line,
   wherein said controller is also for controlling said pump and said 2/2-way valve such that
   (i) at the start of the cycle said 2/2-way valve is closed, and
   (ii) after the viscous material has been transported by movement of said control piston, said pump switches into a resting mode and said 2/2-way valve is opened to relieve said supply line and said first main line from pressure due to the viscous fluid in said supply line flowing through said return line and into the viscous material reservoir.

3. The apparatus according to claim 2, wherein said 3/2-way valve is in a connection block.

4. The apparatus according to claim 3, wherein the viscous material is a lubricant, the locations are lubrication sites, and the plurality of the locations is one half of the locations.

5. The apparatus according to claim 4, further comprising:
   a pressure switch, associated with said pump, for switching said pump into the resting mode when a specified pressure in said supply line is reached.

6. The apparatus according to claim 5, wherein said control piston includes at least one control pin for cooperating with a proximity switch.

7. The apparatus according to claim 6, further comprising:
   another two-line distributor connected in series with said two-line distributor via said first and second main lines.

8. The apparatus according to claim 4, wherein said control piston includes at least one control pin for cooperating with a proximity switch.

9. The apparatus according to claim 8, further comprising:
   another two-line distributor connected in series with said two-line distributor via said first and second main lines.

10. The apparatus according to claim 4, further comprising:
    another two-line distributor connected in series with said two-line distributor via said first and second main lines.

11. The apparatus according to claim 4, wherein said controller is for further controlling said pump, said 2/2-way valve and said 3/2-way valve such that
    (i) after passage of a resting time, said pump is removed from the resting mode and operates to deliver the lubricant, with said 2/2-way valve closed and said 3/2-way valve positioned so as to place said supply line in fluid communication with said second main line, through said supply line and into said second main line, then
    (ii) through pressure build-up in said second main line, resulting from the lubricant flowing through said supply line into said second main line, said two-line distributor operates to transport the lubricant, by movement of said control piston, into said first compression chamber and to the other half of the lubrication sites, and
    (iii) after the lubricant has been transported by movement of said control piston into said first compression chamber and to the other half of the lubrication sites, said pump switches into a resting mode and said 2/2-way valve is opened to relieve said supply line and said second main line from pressure due to the lubricant in said supply line flowing through said return line and into the viscous material reservoir, so as to complete the work cycle.

12. The apparatus according to claim 2, wherein
said controller is for further controlling said pump, said 2/2-way valve and said 3/2-way valve such that
  (i) after passage of a resting time, said pump is removed from the resting mode and operates to deliver the viscous material, with said 2/2-way valve closed and said 3/2-way valve positioned so as to place said supply line in fluid communication with said second main line, through said supply line and into said second main line, then
  (ii) through pressure build-up in said second main line, resulting from the viscous material flowing through said supply line into said second main line, said two-line distributor operates to transport the viscous material, by movement of said control piston, into said first compression chamber and to another plurality of the locations, and
  (iii) after the viscous material has been transported by movement of said control piston into said first compression chamber and to the another plurality of the locations, said pump switches into a resting mode and said 2/2-way valve is opened to relieve said supply line and said second main line from pressure due to the viscous material in said supply line flowing through said return line and into the viscous material reservoir, so as to complete the work cycle.

13. The apparatus according to claim 12, further comprising:
  a pressure switch, associated with said pump, for switching said pump into the resting mode when a specified pressure in said supply line is reached.

14. The apparatus according to claim 12, wherein
said control piston includes at least one control pin for cooperating with a proximity switch.

15. The apparatus according to claim 12, further comprising:
  another two-line distributor connected in series with said two-line distributor via said first and second main lines.

16. The apparatus according to claim 2, further comprising:
  a pressure switch, associated with said pump, for switching said pump into the resting mode when a specified pressure in said supply line is reached.

17. The apparatus according to claim 2, wherein
said control piston includes at least one control pin for cooperating with a proximity switch.

18. The apparatus according to claim 2, further comprising:
  another two-line distributor connected in series with said two-line distributor via said first and second main lines.

19. The apparatus according to claim 1, wherein
said control piston includes at least one control pin for cooperating with a proximity switch.

20. The apparatus according to claim 1, further comprising:
  another two-line distributor connected in series with said two-line distributor via said first and second main lines.

* * * * *

UNITED STATES PATENT AND TRADEMARK OFFICE
CERTIFICATE OF CORRECTION

PATENT NO. : 7,367,428 B2
APPLICATION NO. : 10/487215
DATED : May 6, 2008
INVENTOR(S) : Hartmut Schmidt It is certified that error appears in the above-identified patent and that said Letters Patent is hereby corrected as shown below:

On the title page
In Item (73), please replace "Lincoln GmbH & Co. KG" with -- Lincoln GmbH --.

Signed and Sealed this

Twenty-second Day of December, 2009

David J. Kappos
*Director of the United States Patent and Trademark Office*